(12) United States Patent
Jain et al.

(10) Patent No.: US 7,639,608 B1
(45) Date of Patent: Dec. 29, 2009

(54) PRIORITY AWARE MAC FLOW CONTROL

(75) Inventors: Nitin Jain, Saratoga, CA (US);
Rajkumar Jalan, Saratoga, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 947 days.

(21) Appl. No.: 10/693,037

(22) Filed: Oct. 23, 2003

(51) Int. Cl.
  H04L 12/28   (2006.01)
  H04L 12/56   (2006.01)
  G06F 15/16   (2006.01)

(52) U.S. Cl. .................. 370/229; 370/235; 370/252; 370/352; 370/389; 370/406; 709/230; 709/232; 709/235; 709/236

(58) Field of Classification Search ......... 370/229–463; 709/230–236
See application file for complete search history.

(56) References Cited

U.S. PATENT DOCUMENTS

| | | | |
|---|---|---|---|
| 4,727,537 A | 2/1988 | Nichols | |
| 5,305,321 A | 4/1994 | Crayford | |
| 5,355,375 A | 10/1994 | Christensen | |
| 5,436,617 A | 7/1995 | Adams et al. | |
| 5,517,520 A | 5/1996 | Chi | |
| 5,535,211 A | 7/1996 | Yano | |
| 5,673,254 A | 9/1997 | Crayford | |
| 6,084,879 A * | 7/2000 | Berl et al. | 370/389 |
| 6,128,665 A | 10/2000 | Iturralde | |
| 6,147,995 A | 11/2000 | Dobbins et al. | |
| 6,167,029 A * | 12/2000 | Ramakrishnan | 370/235 |
| 6,170,022 B1 | 1/2001 | Linville et al. | |
| 6,181,699 B1 | 1/2001 | Crinion et al. | |
| 6,405,258 B1 * | 6/2002 | Erimli et al. | 709/235 |
| 6,539,022 B1 | 3/2003 | Virgile | |
| 6,560,236 B1 | 5/2003 | Varghese et al. | |
| 6,707,817 B1 * | 3/2004 | Kadambi et al. | 370/390 |
| 6,957,269 B2 * | 10/2005 | Williams et al. | 709/235 |

(Continued)

FOREIGN PATENT DOCUMENTS

EP    0529774 A1    3/1993

(Continued)

OTHER PUBLICATIONS

"Annex B (informative), System Guidelines: B.1 Baseband System Guidelines and Concepts, 10 Mb/s," IEEE Std.. 802.3, Section One, Mar. 2002, pp. 489-511.

(Continued)

Primary Examiner—Ayaz R Sheikh
Assistant Examiner—Venkatesh Haliyur
(74) Attorney, Agent, or Firm—Nixon Peabody LLP; John P. Schaub

(57) ABSTRACT

Solutions are provided that allow a network device to apply flow control on the MAC layer while taking into account the priority of the frame of traffic. This may be accomplished by generating a frame indicating that traffic flow should be paused, while utilizing a new opcode value, or alternatively by utilizing a new type/length value (possibly combined with a new opcode value). A receiving device may then examine the fields of the frame to determine whether it should it should use priority-based pausing, and then examine other fields to determine which priority-levels to pause and for how long. This allows for improved efficiency in flow control on the MAC layer.

70 Claims, 13 Drawing Sheets

U.S. PATENT DOCUMENTS

| | | | |
|---|---|---|---|
| 6,957,270 B1 * | 10/2005 | Erimli et al. | 709/235 |
| 6,981,054 B1 * | 12/2005 | Krishna | 709/235 |
| 7,009,968 B2 * | 3/2006 | Ambe et al. | 370/389 |
| 7,020,139 B2 * | 3/2006 | Kalkunte et al. | 370/392 |
| 7,062,568 B1 * | 6/2006 | Senevirathne et al. | 709/234 |
| 7,065,050 B1 * | 6/2006 | Herbst | 370/235 |
| 7,145,869 B1 * | 12/2006 | Kadambi et al. | 370/229 |
| 7,161,948 B2 * | 1/2007 | Sampath et al. | 370/402 |
| 7,180,857 B2 | 2/2007 | Kawakami et al. | |
| 7,212,534 B2 * | 5/2007 | Kadambi et al. | 370/395.2 |
| 7,292,572 B2 * | 11/2007 | Liu et al. | 370/389 |
| 7,423,967 B2 * | 9/2008 | Tzeng et al. | 370/231 |
| 7,525,911 B2 * | 4/2009 | Hara et al. | 370/230.1 |
| 2002/0085551 A1 * | 7/2002 | Tzeng | 370/389 |
| 2002/0085585 A1 * | 7/2002 | Tzeng | 370/475 |
| 2002/0087723 A1 | 7/2002 | Williams et al. | |
| 2002/0093973 A1 * | 7/2002 | Tzeng | 370/419 |
| 2003/0037163 A1 | 2/2003 | Kitada et al. | |
| 2003/0055900 A1 | 3/2003 | Glas et al. | |
| 2003/0120759 A1 | 6/2003 | Ogawa | |
| 2003/0185249 A1 * | 10/2003 | Davies et al. | 370/535 |
| 2004/0032868 A1 | 2/2004 | Oda et al. | |
| 2004/0081090 A1 | 4/2004 | Hara et al. | |
| 2004/0095882 A1 | 5/2004 | Hamzah et al. | |
| 2005/0021846 A1 | 1/2005 | Tzeng et al. | |

FOREIGN PATENT DOCUMENTS

| | | |
|---|---|---|
| EP | 0648034 A1 | 4/1995 |
| EP | 0948853 B1 | 8/2004 |

OTHER PUBLICATIONS

"Baseband system guidelines and concepts, 10 Mb/s", from Annex B, *System Guidelines, IEEE*, Std 802.3-2002, Section One, pp. 489-511.

Office Action for U.S. Appl. No. 10/702,387 dated Jun. 14, 2007.

Final Office Action for U.S. Appl. No. 10/702,387 dated Nov. 27, 2007.

Office Action for U.S. Appl. No. 10/702,387 dated May 30, 2008.

* cited by examiner

| Destination Address | 01-80-c2-00-00-01 |
|---|---|
| Source Address | |
| Type/Length | 8808 |
| Opcode | 3 |
| Priority Mask | 00000111 |
| Pause Time | 00-00-00-00-00-03-05-07 |
| Reserved | |

PRIORITY AWARE MAC FLOW CONTROL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to the field of switching in a computer network. More particularly, the present invention relates to the controlling the flow of packets through Media Access Control (MAC) layer switching, while honoring the priority levels of the packets.

BACKGROUND OF THE INVENTION

A switch is a device that provides a switching function (i.e., determines a physical path) in a data communications network. Switching may often involve transferring information, such as digital data packets or frames, among entities of the network. Switching is accomplished by examining data on one or more of the network layers. One such type of switching is media access control (MAC) address-based switching, which involves switching in the data link layer. The data link layer is also commonly referred to as layer 2 of the OSI Reference Model. Specifically, switching may occur through Ethernet and/or Gigabit Ethernet on full duplex ports for layer 2 networks.

During switching, there is often a need for flow control of packets, in case of network outages or if a network device does not have enough resources to handle the received traffic. In a full duplex network, a receiver can signal to the transmitter to stop sending the traffic if it does not have enough resources to handle the traffic. The IEEE 802.3x Specification (now part of 802.3, Annex 31B), uses PAUSE frames for a device to signal another device. The specialized MAC control PAUSE frames according to IEEE 802.3x are depicted in FIG. 1. Each frame 100 comprises a destination address 102 (6 bytes), a source address 104 (6 bytes), a type/length field 106 (2 bytes), an opcode 108 (2 bytes), a pause time field (2 bytes) 110 and 42 bytes of reserved empty space 112. When a frame is transmitted, it is preceded by a 7 byte preamble and 1 byte Start-Frame-Delimiter, and then followed by a 4 byte frame check sequence.

The PAUSE frame causes any device receiving it to stop forwarding traffic to the requested device for the specified period of time. The hope is that when that period of time is up, the device has resources available for the traffic.

This flow control mechanism, however, does not discriminate among the incoming frames—it applies to all incoming frames to a device. In certain systems, however, frames may be prioritized. For example, voice data may have a high priority level as it is extremely time sensitive, whereas text data may have a low priority level. Furthermore, certain subscriber's traffic may be afforded higher priority than others. The prior art flow control mechanism, however, violates these priorities by simply ceasing all incoming transmissions. This can even defeat the purpose of flow control in the first place, by deteriorating network throughput, causing more transmissions, and a compounding of the problem.

What is needed is a mechanism wherein the MAC can take the action of the flow control and apply it in a way that takes into account the priority of the frames.

Furthermore, currently PAUSE frames are sent out as untagged and only have significance on a single link. FIG. 2 is a diagram illustrating a typical system utilizing PAUSE frames. Here, the device that transmits the PAUSE frame 200 wishes to cause another device 202 to hold off on transmitting frames for a time. The other device 202 processes the PAUSE frame it receives but does nothing further with the frame itself.

However, in the metro Ethernet environment, clients and servers may not be directly connected, but rather connected over several hops. FIG. 3 is a diagram illustrating a typical metro Ethernet environment. The transmitting device 300 in a first VLAN is separated from the receiving device 302, also in the first VLAN, by several hops 304-314, which are typically switches or hubs. Currently, the point-to-point nature of the PAUSE mechanism prevents the receiving device 302 from receiving the PAUSE frame, because the first hop 304 processes the frame without forwarding it. What is needed is a mechanism to extend the PAUSE frame solution to Virtual Local Area Networks (VLANs) across multiple hops. What is also needed is a mechanism that would allow the traffic flow in a specific VLAN to be paused, without pausing traffic flow in other VLANs.

BRIEF DESCRIPTION

Solutions are provided that allow a network device to apply flow control on the MAC layer while taking into account the priority of the frame of traffic. This may be accomplished by generating a frame indicating that traffic flow should be paused, while utilizing a new opcode value, or alternatively by utilizing a new type/length value (possibly combined with a new opcode value). A receiving device may then examine the fields of the frame to determine whether it should it should use priority-based pausing, and then examine other fields to determine which priority-levels to pause and for how long. This allows for improved efficiency in flow control on the MAC layer.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. The computer programs may be stored on a program storage device readable by a machine, tangibly embodying a program of instructions executable by the machine to perform a method as described herein. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Furthermore, the present invention is described in the context of a switch. However, one of ordinary skill in the art will recognize that the term switch should be read broadly, so as to include any device that directs packets, including a router and a gateway.

The present invention provides mechanisms to allow a network device to apply flow control on the MAC layer while taking into account the priority of the frames of traffic.

Figure 1:
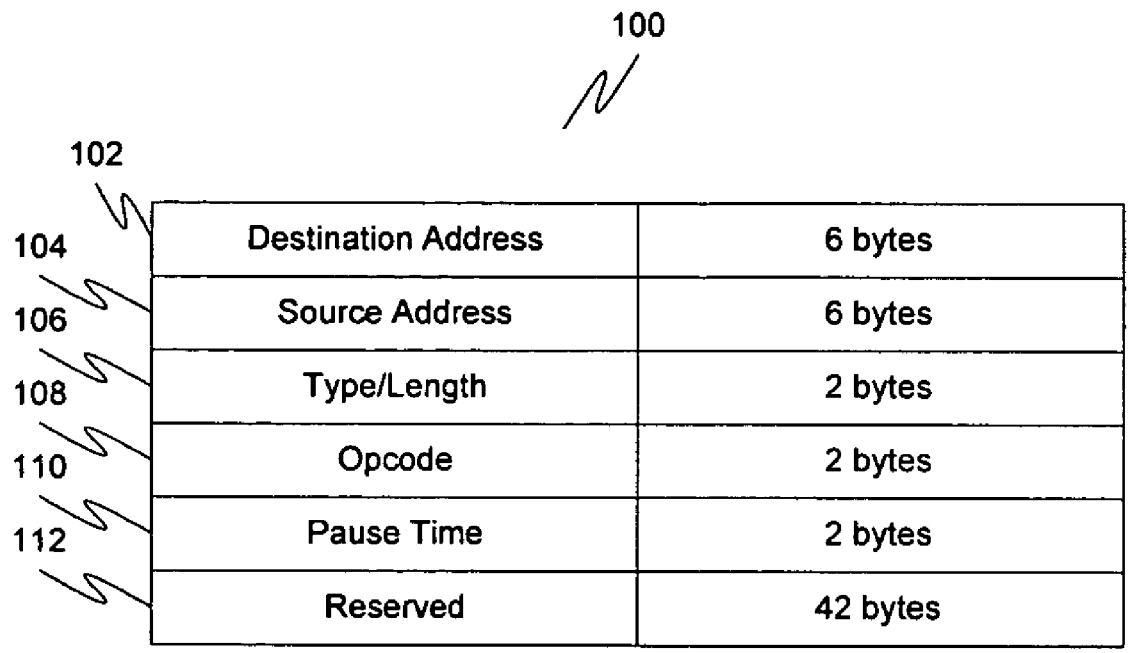
FIG. 1 is a diagram illustrating MAC control PAUSE frames according to IEEE 802.3x.
Figure 2:
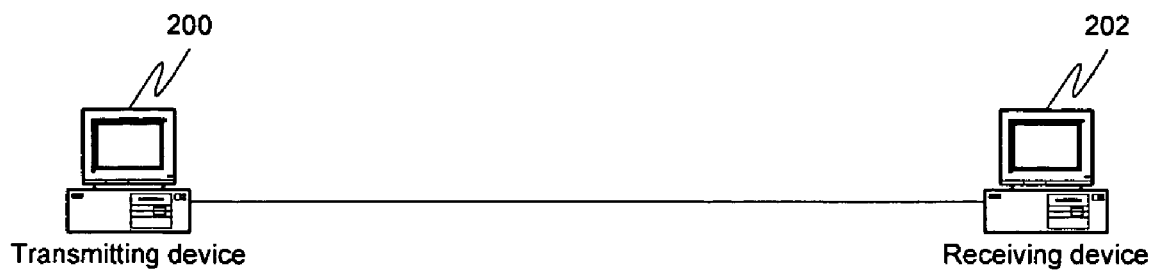
FIG. 2 is a diagram illustrating a typical system utilizing PAUSE frames.
Figure 3:
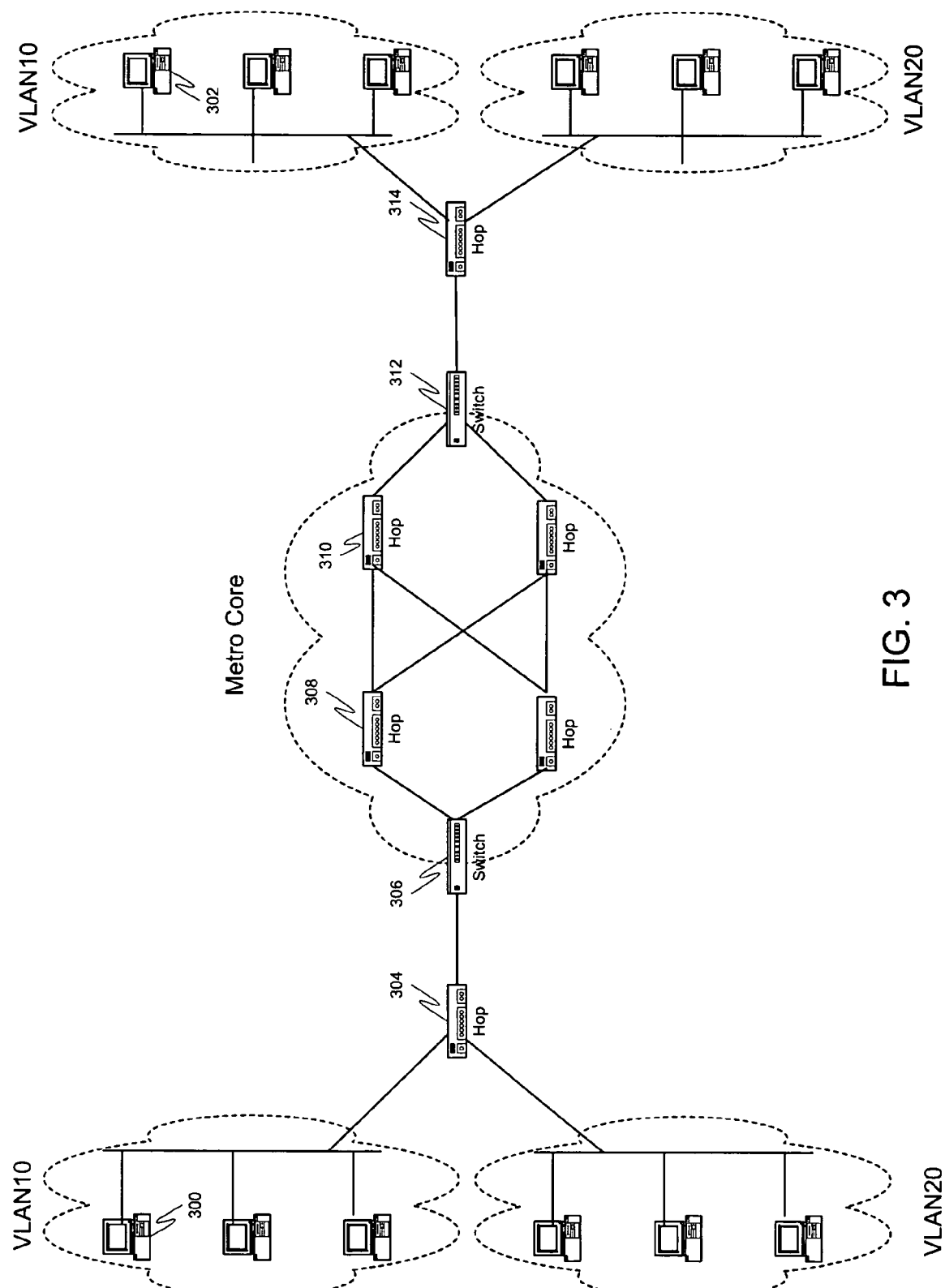
FIG. 3 is a diagram illustrating a typical metro Ethernet environment.
Figure 4:
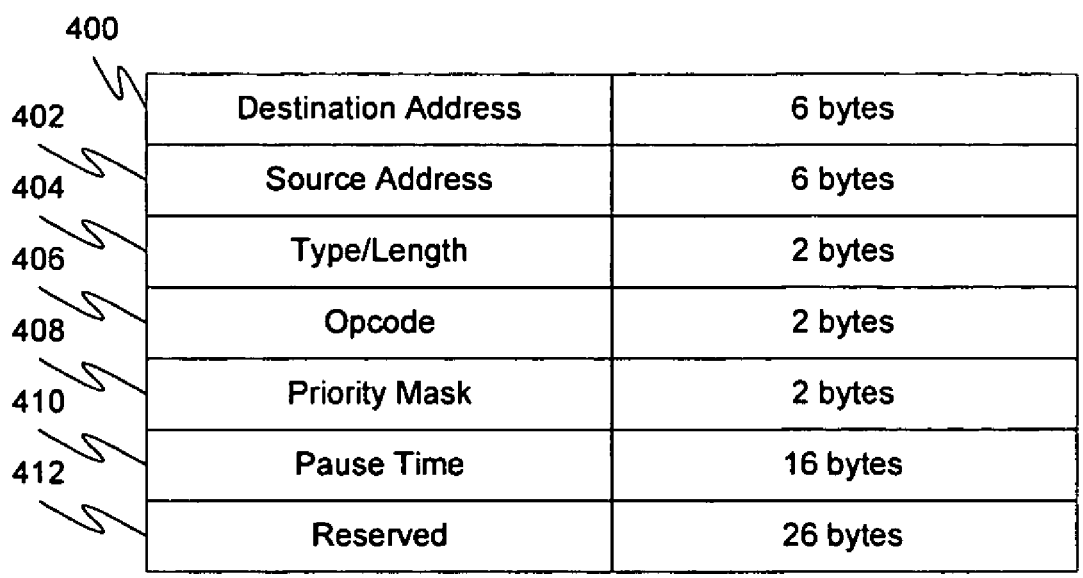
FIG. 4 is a diagram illustrating a PAUSE frame format in accordance with an embodiment of the present invention.

Two mechanisms are described herein for applying flow control on a MAC layer for packets having a priority value. One of ordinary skill in the art will recognize that the specifics of these mechanisms are merely examples and should not be read as limiting. In one embodiment of the present invention, a different opcode value along with a new field may be utilized in the PAUSE frame in order to indicate how to handle frames of varying priorities. The new field may be termed a priority mask, and may be used to identify to which priority to apply the PAUSE command. Thus, FIG. 4 is a diagram illustrating a PAUSE frame format in accordance with an embodiment of the present invention. Destination address 400, source address 402 and type/length 404 may remain the same as the typical PAUSE frame. The opcode field 406 may contain a different value.

The new priority mask field 408 may be two bytes long, however the first byte may be unused in systems having 8 or fewer possible priority levels. In this embodiment, each bit of the second byte may correspond to a different priority level. Therefore, bit 0 might correspond to a priority level of 0, bit 1 to a priority level of 1, etc. The presence of any bit signals the traffic with the specific priority to be paused.

Figure 5:
FIG. 5 is a diagram illustrating an example PAUSE frame in accordance with an embodiment of the present invention.

In an embodiment of the present invention, the pause time field 410 may be extended to 16 bytes, to allow for each priority level to have a different pause time. This may be utilized only when it is desired to have varying pause times—if it is more desirable in a specific instance to have a single pause time for all paused traffic, the only pause time field may be used. The new pause time field allows for 8 2-byte values for pause time. For example, as depicted in FIG. 5, if it is desired for all traffic with priorities of 0, 1, and 2 to be paused, with the pause time value of traffic with priority 0 being 7, traffic with priority 1 being 5, and traffic with priority 2 being 3, then the priority mask 500 may be set at 00000111, and the pause time array 502 set at zero for each of the first 5 2-byte entries, the sixth entry being set at 0x3, the seventh at 0x5, and the eighth at 0x7.

Typically, the PAUSE frame utilizes an opcode value of 1. In an embodiment of the present invention, an opcode value of 2 may indicate the presence of the priority mask field—thus the receiving device would pause traffic with a priority value indicated by the priority mask. The pausing in this instance would be for a set time for all priorities, thus using only a single value in the pause time field.

An opcode value of 3, then, may indicate the presence of both the priority mask field and the new pause time field, thus indicating to the receiving device that it should pause traffic with a priority value indicated by the priority mask, for time periods as specified in the new pause time field.

In another embodiment of the present invention, a new type/length value may be used. This embodiment is beneficial when encountering devices utilizing older MAC standards, which may not be able to understand the new opcode values described above. Typically, the value "8808" is utilized in the type/length field to indicate a PAUSE frame. In this embodiment, the value "8809" may be used, for example, to indicate that this is a PAUSE frame that handles priority. The opcode field may then be used to indicate whether or not all the traffic priority levels utilize the same pause time—rather than values of 2 and 3 they may be, for example, 1 and 2. Otherwise, the frame format described in FIG. 5 may be utilized in this embodiment as is. Thus, the presence of "8809" in the type/length field along with a value of 1 in the opcode field would indicate the presence of the priority mask field and that the receiving device should pause traffic with the corresponding priority value(s) for a set, single period of time set in the pause time field. The presence of "8809" in the type/length field along with a value of 2 in the opcode field would indicate the presence of the priority mask field and the new pause time field, thus indicating to the receiving device that it should pause traffic with a priority value indicated by the priority mask, for time periods as specified in the new pause time field.

Figure 6:
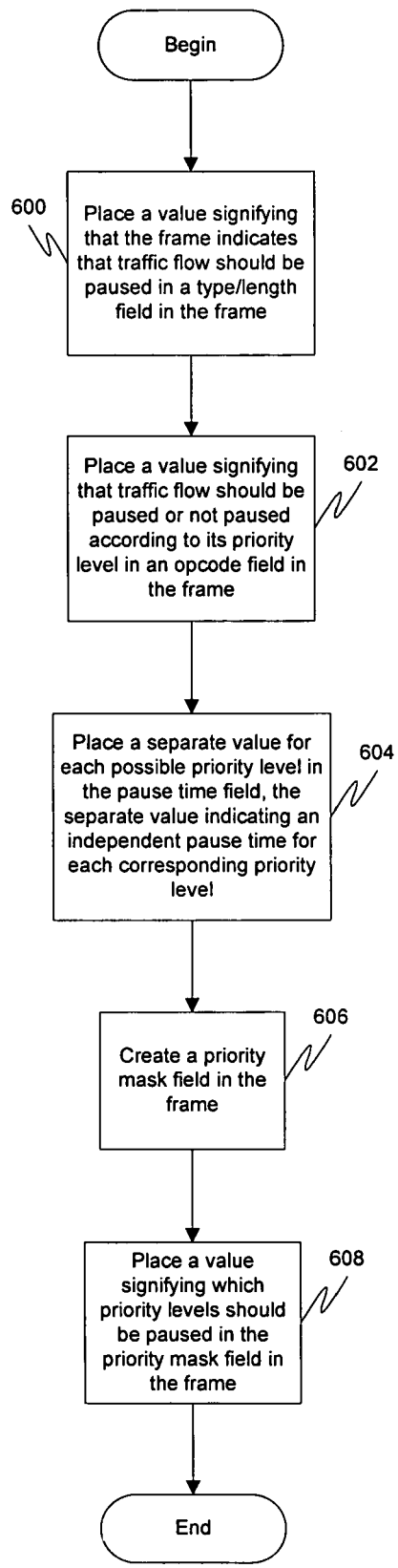
FIG. 6 is a flow diagram illustrating a method for generating a frame indicating that traffic flow should be paused to a network device, the traffic flow having varying priority levels, in accordance with an embodiment of the present invention.

FIG. 6 is a flow diagram illustrating a method for generating a frame indicating that traffic flow should be paused to a network device, the traffic flow having varying priority levels, in accordance with an embodiment of the present invention. At 600, a value signifying that the frame indicates that traffic flow should be paused may be placed in a type/length field in the frame. This may be a value identical to that of standard PAUSE frames, for example. At 602, a value signifying that traffic flow should be paused or not paused according to its priority level may be placed in an opcode field in the frame. This value may also indicate whether the pausing will be for time indicated by a pause time field in the frame without regard for the priority level (if the same pause time for each priority level is desired), or whether the pausing will be for times corresponding to each priority level indicated by the pause time field (if independent pause times for each priority level are desired). If the latter, then at 604, a separate value for each possible priority level may be placed in the pause time field, the separate value indicating an independent pause time for each corresponding priority level. The pause time field in that case may be equal in size to the pause time field in a standard PAUSE frame multiplied by the number of possible priority levels. These opcode values may be values not used by standard PAUSE frames in the opcode field. At 606, a priority mask field may be created in the frame. At 608, a value signifying which priority levels should be paused may be placed in the priority mask field in the frame.

Figure 7:
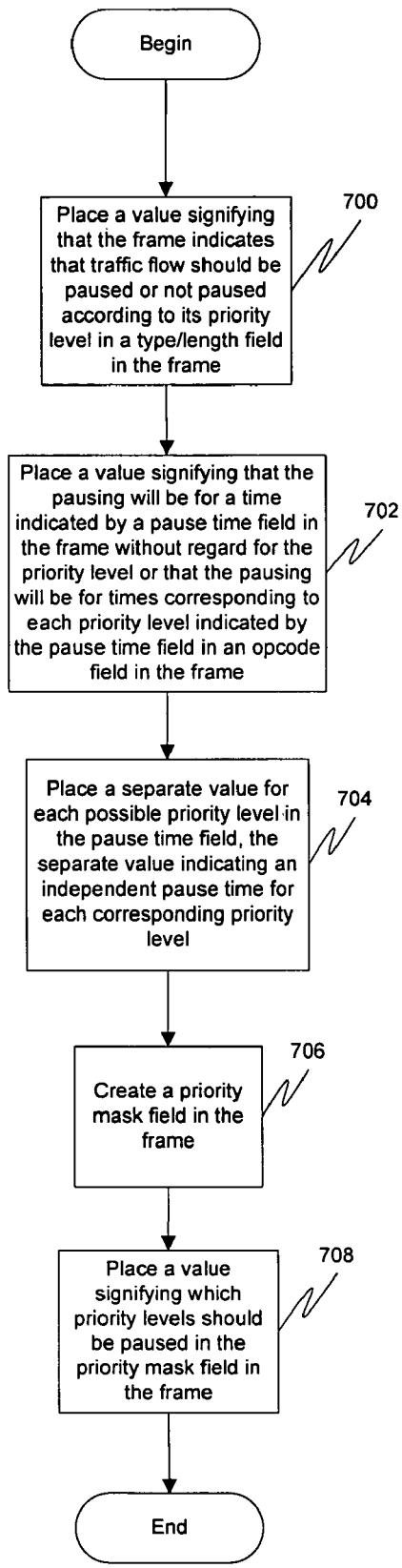
FIG. 7 is a flow diagram illustrating a method for generating a frame indicating that traffic flow should be paused to a network device, the traffic flow having varying priority levels, in accordance with another embodiment of the present invention.

FIG. 7 is a flow diagram illustrating a method for generating a frame indicating that traffic flow should be paused to a network device, the traffic flow having varying priority levels, in accordance with another embodiment of the present invention. At 700, a value signifying that the frame indicates that traffic flow should be paused or not paused according to its priority level may be placed in a type/length field in the frame. This may be a value unused in standard PAUSE frames, for example. At 702, a value signifying that the pausing will be for a time indicated by a pause time field in the frame without regard for the priority level (if the same pause time for each priority level is desired), or that the pausing will be for times corresponding to each priority level indicated by the pause time field (if independent pause times for each priority level are desired) may be placed in an opcode field in the frame. If the latter, then at 704, a separate value for each possible priority level may be placed in the pause time field, the separate value indicating an independent pause time for each corresponding priority level. The pause time field in that case may be equal in size to the pause time field in a standard PAUSE frame multiplied by the number of possible priority levels. At 706, a priority mask field may be created in the frame. At 708, a value signifying which priority levels should be paused may be placed in the priority mask field in the frame.

Figure 8:
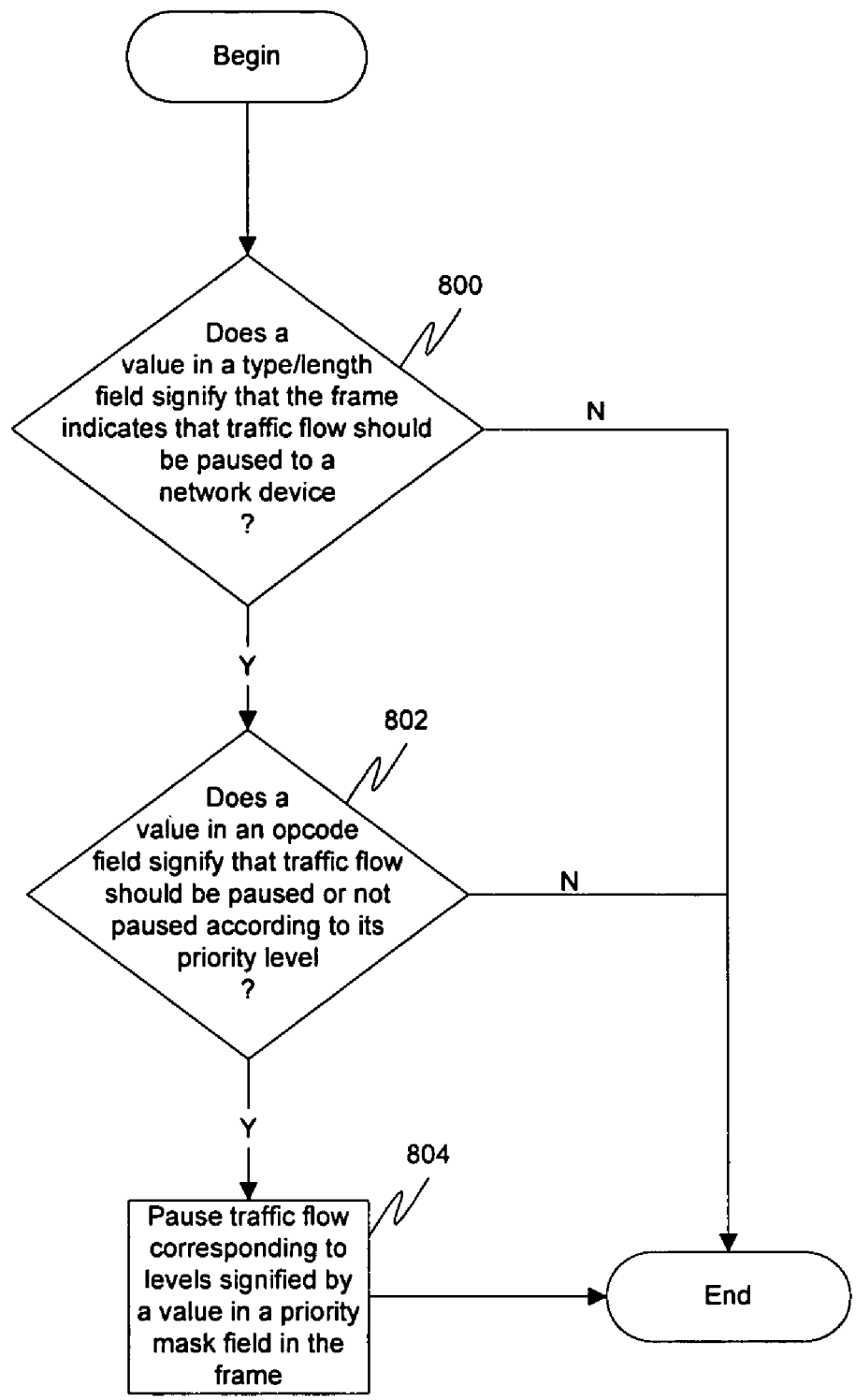
FIG. 8 is a flow diagram illustrating a method for handling a frame in a network with traffic flow having varying priority levels, in accordance with an embodiment of the present invention.

FIG. 8 is a flow diagram illustrating a method for handling a frame in a network with traffic flow having varying priority levels, in accordance with an embodiment of the present invention. At 800, a value in a type/length field in the frame may be examined to determine if it signifies that the frame indicates that traffic flow should be paused to a network device. If it does, then at 802, a value in an opcode field in the frame may be examined to determine if it signifies that traffic flow should be paused or not paused according to its priority level. If this is also true, then at 804, traffic flow with priority levels corresponding to levels signified by a value in a priority mask field in the frame may be paused. At 802, the examining of the opcode field may include examining it to determine if it also signifies that the pausing will be for a time indicated by a pause time field in the frame without regard to priority level or whether the pausing will be for times corresponding to each priority level indicated by the pause time field. If the former, then at 804, the pausing may include pausing the traffic flow for a time period indicated by the pause time field in the frame without regard to priority level. If the latter, then at 804, the pausing may include pausing the traffic flow for time periods indicated by times corresponding to each priority level in the pause time field. These times may be a separate value for each possible priority level indicating an independent pause time for each corresponding priority level.

Figure 9:
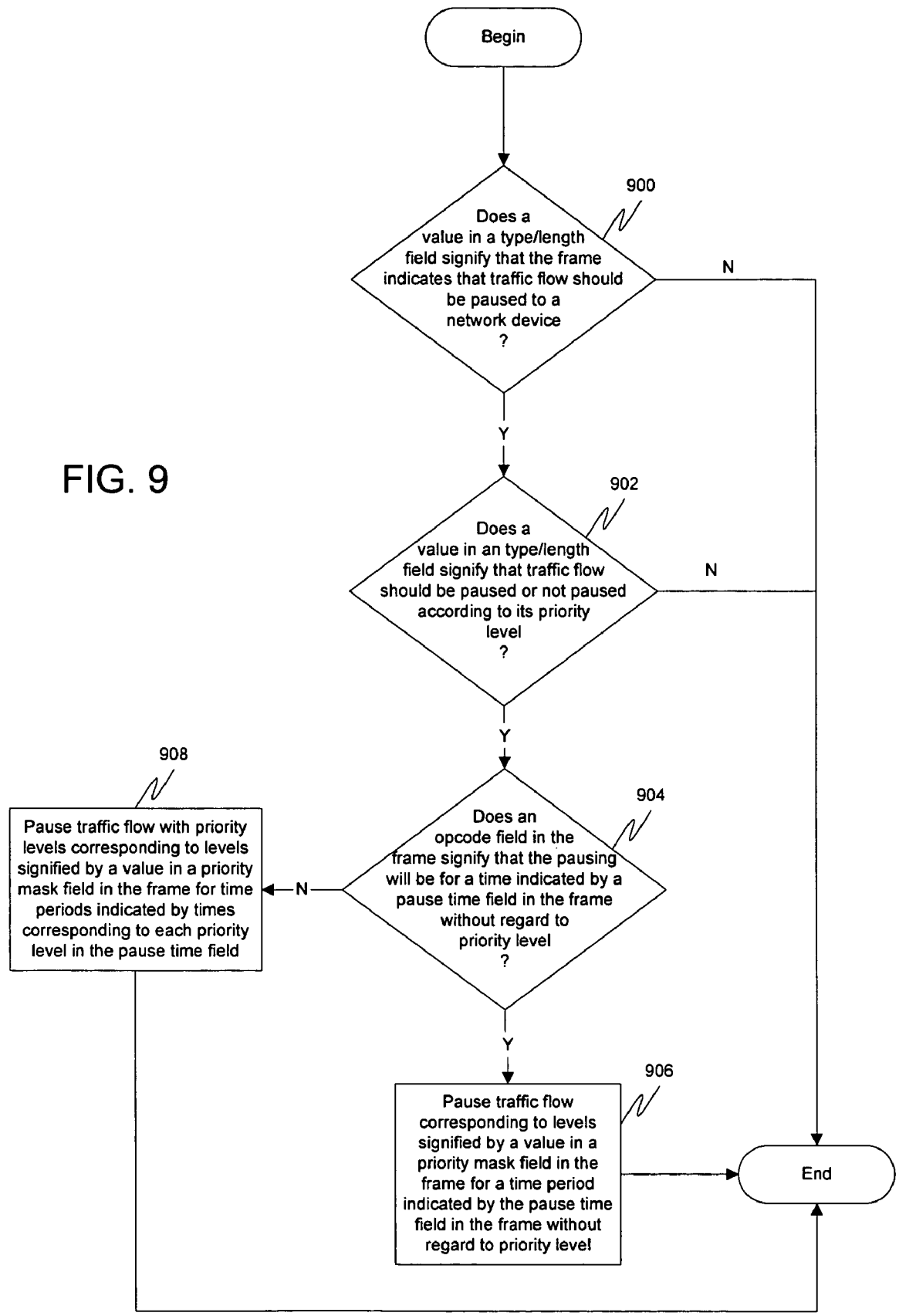
FIG. 9 is a flow diagram illustrating a method for handling a frame in a network with traffic flow having varying priority levels, in accordance with another embodiment of the present invention.

FIG. 9 is a flow diagram illustrating a method for handling a frame in a network with traffic flow having varying priority levels, in accordance with another embodiment of the present invention. At 900, a value in a type/length field in the frame may be examined to determine if it signifies that the frame indicates that traffic flow should be paused to a network device and, at 902, if it signifies that traffic flow should be paused or not paused according to its priority level. If both are true, then at 904, a value in an opcode field in the frame may be examined to determine if it signifies that the pausing will be for a time indicated by a pause time field in the frame without regard to priority level or whether the pausing will be for times corresponding to each priority level indicated by the pause time field. If the former, then at 906, the traffic flow with priority levels corresponding to levels signified by a value in a priority mask field in the frame may be paused for a time period indicated by the pause time field in the frame without regard to priority level. If the latter, then at 908, the traffic flow with priority levels corresponding to levels signified by a value in a priority mask field in the frame may be paused for time periods indicated by times corresponding to each priority level in the pause time field. These times may be a separate value for each possible priority level indicating an independent pause time for each corresponding priority level.

Figure 10:
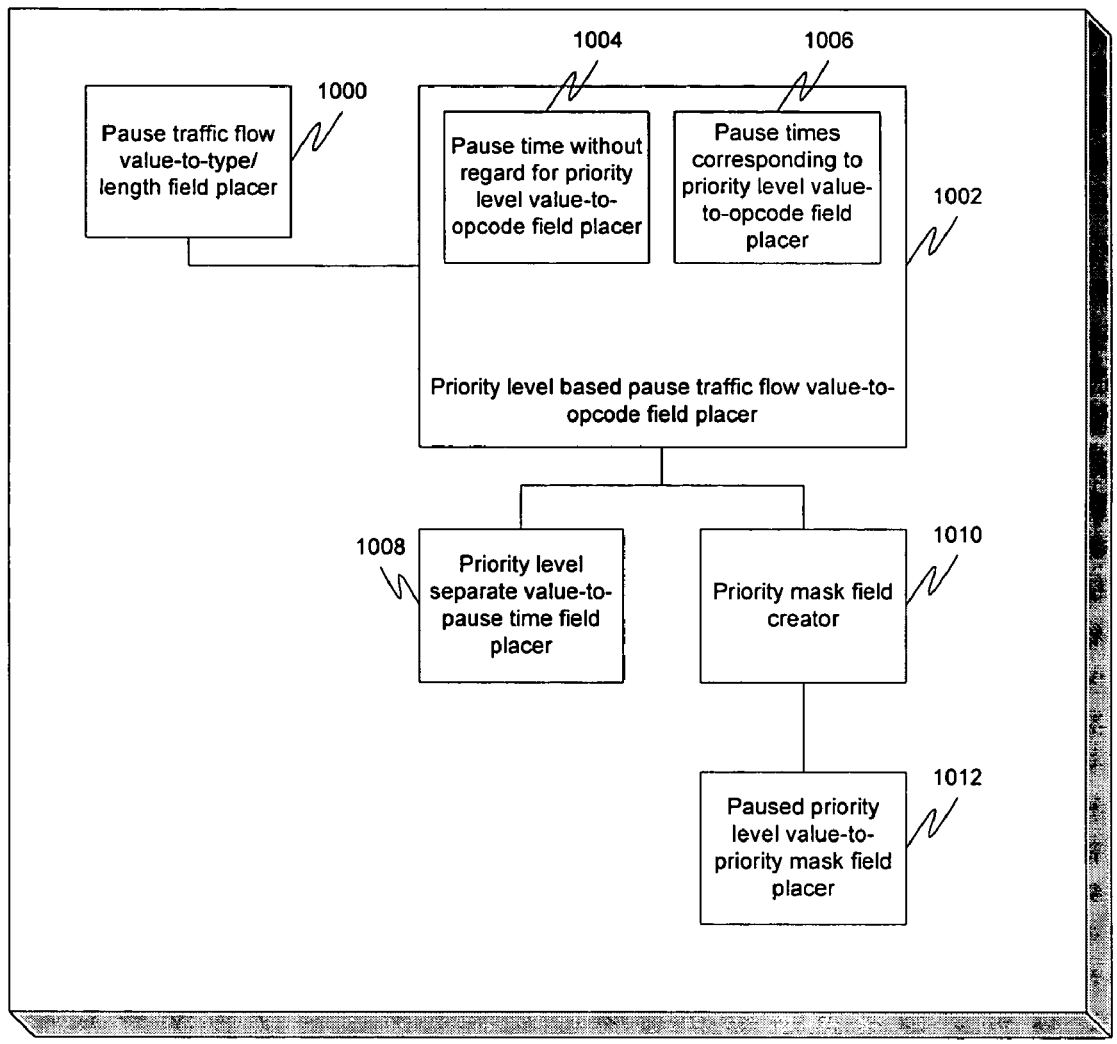
FIG. 10 is a block diagram illustrating an apparatus for generating a frame indicating that traffic flow should be paused to a network device, the traffic flow having varying priority levels, in accordance with an embodiment of the present invention.

FIG. 10 is a block diagram illustrating an apparatus for generating a frame indicating that traffic flow should be paused to a network device, the traffic flow having varying priority levels, in accordance with an embodiment of the present invention. A pause traffic flow value-to-type/length field placer 1000 may place a value signifying that the frame indicates that traffic flow should be paused in a type/length field in the frame. This may be a value identical to that of standard PAUSE frames, for example. A priority level based pause traffic flow value-to-opcode field placer 1002 coupled to the pause traffic flow value-to-type/length field placer 1000 may place a value signifying that traffic flow should be paused or not paused according to its priority level in an opcode field in the frame. This value may also indicate whether the pausing will be for time indicated by a pause time field in the frame without regard for the priority level (if the same pause time for each priority level is desired), by using a pause time without regard for priority level value-to-opcode field placer 1004, or whether the pausing will be for times corresponding to each priority level indicated by the pause time field (if independent pause times for each priority level are desired), by using a pause times corresponding to priority level value-to-opcode field placer 1006. If the latter, then a priority level separate value-to-pause time field placer 1008 coupled to the priority level based pause traffic flow value-to-opcode field placer 1002 may place a separate value for each possible priority level in the pause time field, the separate value indicating an independent pause time for each corresponding priority level. The pause time field in that case may be equal in size to the pause time field in a standard PAUSE frame multiplied by the number of possible priority levels. These opcode values may be values not used by standard PAUSE frames in the opcode field. A priority mask field creator 1010 coupled to the priority level based pause traffic flow value-to-opcode field placer 1002 may create a priority mask field in the frame. A paused priority level value-to-priority mask field placer 1012 coupled to the priority mask field creator 1010 may place a value signifying which priority levels should be paused in the priority mask field in the frame.

Figure 11:
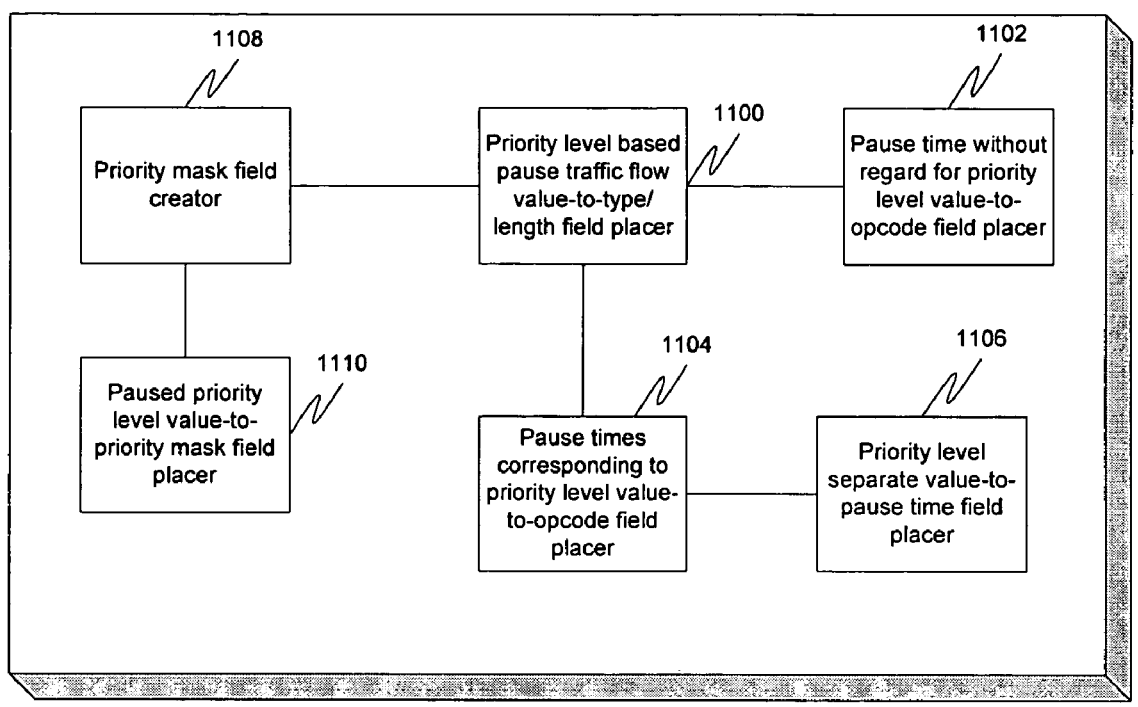
FIG. 11 is a block diagram illustrating an apparatus for generating a frame indicating that traffic flow should be paused to a network device, the traffic flow having varying priority levels, in accordance with another embodiment of the present invention.

FIG. 11 is a block diagram illustrating an apparatus for generating a frame indicating that traffic flow should be paused to a network device, the traffic flow having varying priority levels, in accordance with another embodiment of the present invention. A priority level based pause traffic flow value-to-type/length field placer 1100 may place a value signifying that the frame indicates that traffic flow should be paused or not paused according to its priority level in a type/length field in the frame. This may be a value unused in standard PAUSE frames, for example. A pause time without regard for priority level value-to-opcode field placer 1102 coupled to the priority level based pause traffic flow value-to-type/length field placer 1100 may place a value in the opcode field signifying that the pausing will be for a time indicated by a pause time field in the frame without regard for the priority level if the same pause time for each priority level is desired. Alternatively, a pause times corresponding to priority level value-to-opcode field placer 1104 coupled to the priority level based pause traffic flow value-to-type/length field placer 1100 may place a value in the opcode field signifying that the pausing will be for times corresponding to each priority level indicated by the pause time field if independent pause times for each priority level are desired. If the latter, then a priority level separate value-to-pause time field placer 1106 coupled to the pause times corresponding to priority level value-to-opcode field placer 1104 may place a separate value for each possible priority level in the pause time field, the separate value indicating an independent pause time for each corresponding priority level. The pause time field in that case may be equal in size to the pause time field in a standard PAUSE frame multiplied by the number of possible priority levels. A priority mask field creator 1108 coupled to the priority level based pause traffic flow value-to-type/length field placer 1100 may create a priority mask field in the frame. A paused priority level value-to-priority mask field placer 1110 coupled to the priority mask field creator 1108 may place a value signifying which priority levels should be paused in the priority mask field in the frame.

Figure 12:
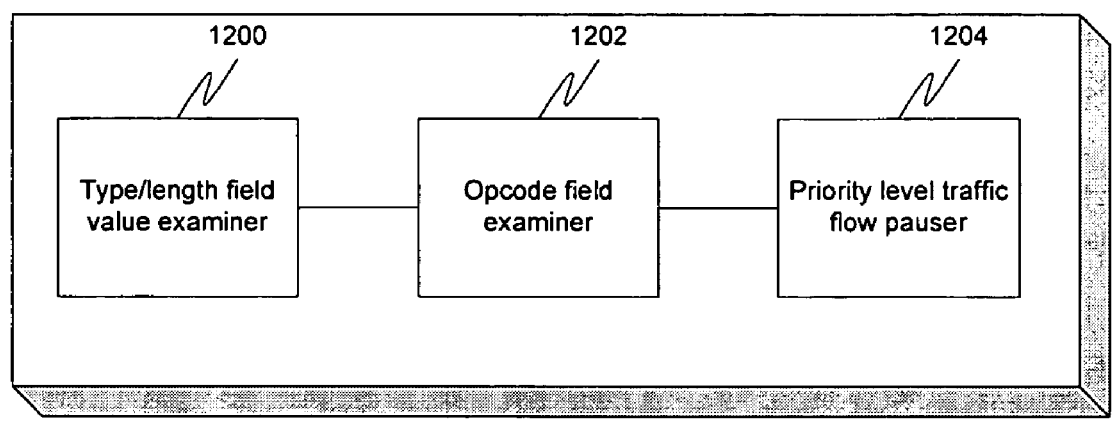
FIG. 12 is a block diagram illustrating an apparatus for handling a frame in a network with traffic flow having varying priority levels, in accordance with an embodiment of the present invention.

FIG. 12 is a block diagram illustrating an apparatus for handling a frame in a network with traffic flow having varying priority levels, in accordance with an embodiment of the present invention. A type/length field value examiner 1200 may examine a value in a type/length field in the frame to determine if it signifies that the frame indicates that traffic flow should be paused to a network device. If it does, then an opcode field value examiner 1202 coupled to the type/length field value examiner 1200 may examine a value in an opcode field in the frame to determine if it signifies that traffic flow should be paused or not paused according to its priority level. If this is also true, then a priority level traffic flow pauser 1204 coupled to the opcode field value examiner 1202 may pause traffic flow with priority levels corresponding to levels signified by a value in a priority mask field in the frame. The examining of the opcode field may include examining it to determine if it also signifies that the pausing will be for a time indicated by a pause time field in the frame without regard to priority level or whether the pausing will be for times corresponding to each priority level indicated by the pause time field. If the former, then the pausing may include pausing the traffic flow for a time period indicated by the pause time field in the frame without regard to priority level. If the latter, then the pausing may include pausing the traffic flow for time periods indicated by times corresponding to each priority level in the pause time field. These times may be a separate value for each possible priority level indicating an independent pause time for each corresponding priority level.

Figure 13:
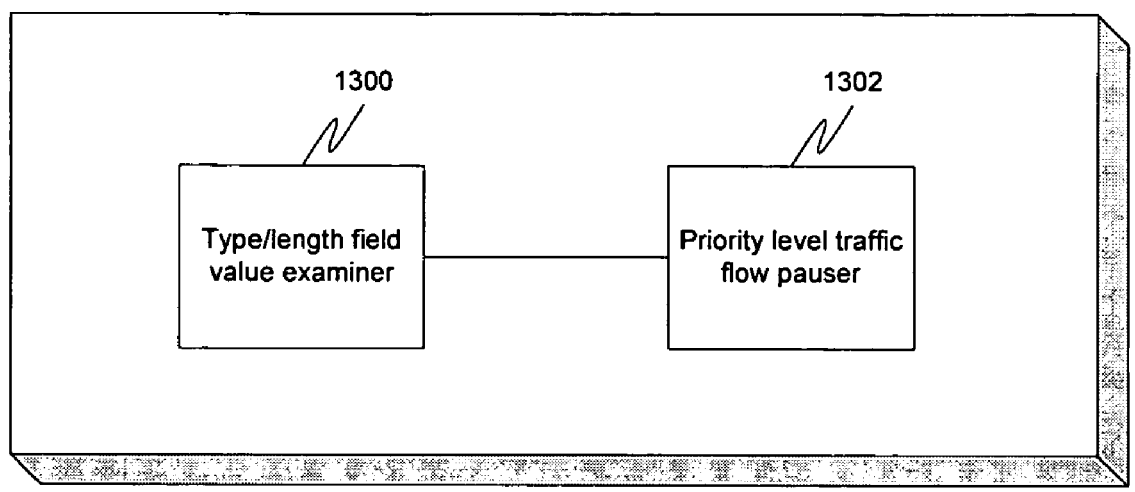
FIG. 13 is a block diagram illustrating an apparatus for handling a frame in a network with traffic flow having varying priority levels, in accordance with another embodiment of the present invention.

FIG. 13 is a block diagram illustrating an apparatus for handling a frame in a network with traffic flow having varying priority levels, in accordance with another embodiment of the present invention. A type/length field value examiner 1300 may examine a value in a type/length field in the frame to determine if it signifies that the frame indicates that traffic flow should be paused to a network device and if it signifies that traffic flow should be paused or not paused according to its priority level. If both are true, then a priority level traffic flow pauser 1302 coupled to the type/length field value examiner 1300 may pause the traffic flow with priority levels corresponding to levels signified by a value in a priority mask field in the frame.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method performed in a network device, the method comprising:
    determining, in the network device, a present need to pause traffic flow to the network device, and if a present need to pause traffic flow to the network device is determined, placing in a type/length field in a frame, a value signifying the frame indicates that traffic flow to the network device should be paused, the traffic flow comprising one or more digital data packets, each of the one or more digital data packets including a priority level, the priority level indicating a relative level of importance of timely delivery of the digital data packet to the network device;
    placing in an opcode field in the frame, a value signifying that traffic flow to the network device should be paused or not paused according to its priority level;
    creating a priority mask field in the frame; and
    placing in the priority mask field, a value signifying which priority levels should be paused.

2. The method of claim 1, wherein the value further indicates that that the pausing will be for time indicated by a pause time field in the frame without regard for the priority level, if it is desired to use the same pause time for each priority level.

3. The method of claim 1, wherein the placing in an opcode field in the frame includes placing a value signifying that traffic flow to the network device should be paused or not paused according to its priority level, and that the pausing will be for times corresponding to each priority level indicated by a pause time field, in an opcode field in the frame if it is not desired to use the same pause time for each priority level.

4. The method of claim 3, further comprising:
placing a separate value for each possible priority level in the pause time field, the separate value indicating an independent pause time for each corresponding priority level.

5. The method of claim 4, wherein the pause time field is equal in size to the pause time field in a standard PAUSE frame multiplied by the number of possible priority levels.

6. The method of claim 1, wherein the frame is a PAUSE frame.

7. The method of claim 4, wherein the value signifying that the frame indicates that traffic flow to the network device should be paused is identical to values used to indicate standard PAUSE frames.

8. The method of claim 4, wherein the value signifying that traffic flow to the network device should be paused or not paused according to its priority level is a value not used by standard PAUSE frames in the opcode field.

9. A method performed in a network device, the method comprising:
determining, in the network device, a present need to pause traffic flow to the network device, and if a present need to pause traffic flow to the network device is determined, placing in a type/length field in a frame, a value signifying that traffic flow to the network device should be paused or not paused according to its priority level, the traffic flow comprising one or more digital data packets, each of the one or more digital data packets including a priority level, the priority level indicating a relative level of importance of timely delivery of the digital data packet to the network device;
creating a priority mask field in the frame; and
placing in the priority mask field, a value signifying which priority levels should be paused.

10. The method of claim 9 wherein the value further indicates that the pausing will be for time indicated by a pause time field in the frame without regard for the priority level, if it is desired to use the same pause time for each priority.

11. The method of claim 9, further comprising:
placing in an opcode field in the frame, a value signifying that the pausing will be for times corresponding to each priority level indicated by a pause time field if it is desired to use the same pause time for each priority.

12. The method of claim 11, further comprising:
placing in the pause time field, a separate value for each possible priority level, the separate value indicating an independent pause time for each corresponding priority level.

13. The method of claim 12, wherein the pause time field is equal in size to the pause time field in a standard PAUSE frame multiplied by the number of possible priorities.

14. The method of claim 9, wherein the frame is a PAUSE frame.

15. The method of claim 9, wherein the value signifying that traffic flow to the network device should be paused or not paused according to its priority level is a value not used by standard PAUSE frames in the type/length field.

16. A method performed in a network device, the method comprising:
examining, in the network device, a value in a type/length field in a frame to determine if it signifies that the frame indicates that traffic flow to the network device should be paused, the traffic flow comprising one or more digital data packets, each of the one or more digital data packets including a priority level, the priority level indicating a relative level of importance of timely delivery of the digital data packet to the network device;
examining a value in an opcode field in the frame to determine if it signifies that traffic flow to the network device should be paused or not paused according to its priority level, if the value in the type/length field signified that the frame indicates that traffic flow to the network device should be paused; and
pausing traffic flow to the network device with priority levels corresponding to levels signified by a value in a priority mask field in the frame if the value in the opcode field signified that traffic flow to the network device should be paused or not paused according to its priority level and if the value in the type/length field signified that the frame indicates that traffic flow to the network device should be paused.

17. The method of claim 16, wherein the examining a value in an opcode field further comprises examining a value in the opcode field to determine if it also signifies that the pausing will be for time indicated by a pause time field in the frame without regard to priority level and the pausing traffic flow further comprises pausing traffic flow to the network device with priority levels corresponding to levels signified by a value in a priority mask field in the frame for a time period indicated by the pause time field in the frame without regard to priority level if the opcode field signifies that the pausing will be for time indicated by a pause time field in the frame without regard to priority level.

18. The method of claim 16, wherein the examining a value in an opcode field further comprises examining a value in the opcode field to determine if it also signifies that the pausing will be for times corresponding to each priority level indicated by a pause time and the pausing traffic flow further comprises pausing traffic flow to the network device with priority levels corresponding to levels signified by a value in a priority mask field in the frame for time periods indicated by a times corresponding to each priority level in a pause time field in the frame if the opcode field signifies that the pausing will be for times corresponding to each priority level indicated by a pause time.

19. The method of claim 18, wherein the times are a separate value for each possible priority level indicating an independent pause time for each corresponding priority level.

20. A method performed in a network device, the method comprising:
examining, in the network device, a value in a type/length field in a frame to determine if it signifies that the frame indicates that traffic flow to the network device should be paused and if it signifies that traffic flow to the network device should be paused or not paused according to its priority level, the traffic flow comprising one or more digital data packets, each of the one or more digital data packets including a priority level, the priority level indicating a relative level of importance of timely delivery of the digital data packet to the network device; and
pausing traffic flow to the network device with priority levels corresponding to levels signified by a value in a priority mask field in the frame if the value in the type/ length field signified that traffic flow to a network device should be paused and that traffic flow to the network device should be paused or not paused according to its priority level.

21. The method of claim 20, further comprising:
examining a value in an opcode field in the frame to determine if it signifies that the pausing will be for time indicated by a pause time field in the frame without regard to priority level; and
wherein the pausing traffic flow further comprises pausing traffic flow to the network device with priority levels corresponding to levels signified by a value in a priority mask field in the frame for a time period indicated by the pause time field in the frame without regard to priority level if the value in the opcode field signifies that the pausing will be for time indicated by a pause time field in the frame without regard to priority level.

22. The method of claim 20, further comprising:
examining a value in the type/length field to determine if it also signifies that the pausing will be for times corresponding to each priority level indicated by a pause time; and
wherein the pausing traffic flow further comprises pausing traffic flow to the network device with priority levels corresponding to levels signified by a value in a priority mask field in the frame for time periods indicated by a times corresponding to each priority level in a pause time field in the frame if the type/length field signifies that the pausing will be for times corresponding to each priority level indicated by a pause time.

23. The method of claim 22, wherein the times are a separate value for each possible priority level indicating an independent pause time for each corresponding priority level.

24. An apparatus comprising:
a pause traffic flow value-to-type/length field placer configured to, if a present need to pause traffic flow to a network device is determined, place in a type/length field in a frame, a value signifying the frame indicates that traffic flow to the network device should be paused, the traffic flow comprising one or more digital data packets, each of the one or more digital data packets including a priority level, the priority level indicating a relative level of importance of timely delivery of the digital data packet to the network device;
a priority level based pause traffic flow value-to-opcode field placer coupled to the pause traffic flow value-to-type/length field placer and configured to place in an opcode field in the frame, a value signifying that traffic flow to the network device should be paused or not paused according to its priority level;
a priority mask field creator coupled to the priority level based pause traffic flow value-to-opcode field placer and configured to create a priority mask in the frame; and
a paused priority level value-to-priority mask field placer coupled to the priority mask field creator and configured to place in the priority mask field, a value signifying which priority levels should be paused.

25. The apparatus of claim 24, wherein the priority level based pause traffic flow value-to-opcode field placer includes a pause time without regard for priority level value-to-opcode field placer configured to place a value signifying that traffic flow to the network device should be paused or not paused according to its priority level, and that the pausing will be for time indicated by a pause time field in the frame without regard for the priority level, in an opcode field in the frame if it is desired to use the same pause time for each priority level.

26. The apparatus of claim 24, wherein the priority level based pause traffic flow value-to-opcode field placer includes a pause times corresponding to priority level value-to-opcode field placer configured to place a value signifying that traffic flow to the network device should be paused or not paused according to its priority level, and that the pausing will be for times corresponding to each priority level indicated by a pause time field, in an opcode field in the frame if it is not desired to use the same pause time for each priority level.

27. The apparatus of claim 26, further comprising:
a priority level separate value-to-pause time field placer coupled to the priority level based pause traffic flow value-to-opcode field placer configured to place a separate value for each possible priority level in the pause time field, the separate value indicating an independent pause time for each corresponding priority level.

28. An apparatus comprising:
a priority level based pause traffic flow value-to-type/length field placer configured to, if a present need to pause traffic flow to a network device is determined, place in a type/length field in a frame, a value signifying that traffic flow to the network device should be paused or not paused according to its priority level, the traffic flow comprising one or more digital data packets, each of the one or more digital data packets including a priority level, the priority level indicating a relative level of importance of timely delivery of the digital data packet to the network device;
a priority mask field creator coupled to the priority level based pause traffic flow value-to-type/length field placer and configured to create a priority mask field in the frame; and
a paused priority level value-to-priority mask field placer coupled to the priority mask field creator and configured to place in the priority mask field, a value signifying which priority levels should be paused.

29. The apparatus of claim 28, further comprising:
a pause time without regard for priority level value-to-opcode field placer coupled to the priority level based pause traffic flow value-to-type/length field placer and configured to place in an opcode field in the frame, a value signifying that the pausing will be for time indicated by a pause time field in the frame without regard for the priority level if it is desired to use the same pause time for each priority.

30. The apparatus of claim 28, further comprising:
a pause times corresponding to priority level value-to-opcode field placer coupled to the priority level based pause traffic flow value-to-type/length field placer and configured to place in an opcode field in the frame, a value signifying that the pausing will be for times corresponding to each priority level indicated by a pause time field if it is desired to use the same pause time for each priority.

31. The apparatus of claim 30, further comprising:
a priority level separate value-to-pause time field placer coupled to the pause times corresponding to priority level value-to-opcode field placer and configured to place in the pause time field, a separate value for each possible priority level, the separate value indicating an independent pause time for each corresponding priority level.

32. An apparatus comprising:
a type/length field value examiner configured to examine a value in a type/length field in a frame to determine if it signifies that the frame indicates that traffic flow to a network device should be paused, the traffic flow comprising one or more digital data packets, each of the one or more digital data packets including a priority level, the priority level indicating a relative level of importance of timely delivery of the digital data packet to the network device;

an opcode field value examiner coupled to the type/length field value examiner and configured to examine a value in an opcode field in the frame to determine if it signifies that traffic flow to the network device should be paused or not paused according to its priority level, if the value in the type/length field signified that the frame indicates that traffic flow to the network device should be paused; and a priority level traffic flow pauser coupled to the opcode field value examiner configured to pause traffic flow to the network device with priority levels corresponding to levels signified by a value in a priority mask field in the frame if the value in the opcode field signified that traffic flow to the network device should be paused or not paused according to its priority level and if the value in the type/length field signified that the frame indicates that traffic flow to the network device should be paused.

33. An apparatus comprising:

a type/length field value examiner configured to examine a value in a type/length field in a frame to determine if it signifies that the frame indicates that traffic flow to a network device should be paused and if it signifies that traffic flow to the network device should be paused or not paused according to its priority level, the traffic flow comprising one or more digital data packets, each of the one or more digital data packets including a priority level, the priority level indicating a relative level of importance of timely delivery of the digital data packet to the network device; and a priority level traffic flow pauser coupled to the type/length field value examiner and configured to pause traffic flow to the network device with priority levels corresponding to levels signified by a value in a priority mask field in the frame if the value in the type/length field signified that traffic flow to a network device should be paused and that traffic flow to the network device should be paused or not paused according to its priority level.

34. An apparatus comprising:

means for determining a present need to pause traffic flow to a network device, and if a present need to pause traffic flow to the network device is determined, place in a type/length field in a frame, a value signifying the frame indicates that traffic flow to the network device should be paused, the traffic flow comprising one or more digital data packets, each of the one or more digital data packets including a priority level, the priority level indicating a relative level of importance of timely delivery of the digital data packet to the network device; and means for placing in an opcode field in the frame, a value signifying that traffic flow to the network device should be paused or not paused according to its priority level;

means for creating a priority mask field in the frame; and means for placing in the priority mask field, a value signifying which priority levels should be paused.

35. The apparatus of claim 34, wherein the value further indicates that the pausing will be for time indicated by a pause time field in the frame without regard for the priority level, if it is desired to use the same pause time for each priority level.

36. The apparatus of claim 34, wherein the means for placing a value in an opcode field in the frame includes means for placing a value signifying that traffic flow to the network device should be paused or not paused according to its priority level, and that the pausing will be for times corresponding to each priority level indicated by a pause time field, in an opcode field in the frame if it is not desired to use the same pause time for each priority level.

37. The apparatus of claim 36, further comprising:

means for placing a separate value for each possible priority level in the pause time field, the separate value indicating an independent pause time for each corresponding priority level.

38. The apparatus of claim 37, wherein the pause time field is equal in size to the pause time field in a standard PAUSE frame multiplied by the number of possible priority levels.

39. The apparatus of claim 34, wherein the frame is a PAUSE frame.

40. The apparatus of claim 37, wherein the value signifying that the frame indicates that traffic flow to the network device should be paused is identical to values used to indicate standard PAUSE frames.

41. The apparatus of claim 37, wherein the value signifying that traffic flow to the network device should be paused or not paused according to its priority level is a value not used by standard PAUSE frames in the opcode field.

42. An apparatus comprising:

means for determining a present need to pause traffic flow to a network device, and if a present need to pause traffic flow to a network device is determined, placing in a type/length field in a frame, a value signifying that traffic flow to the network device should be paused or not paused according to its priority level, the traffic flow comprising one or more digital data packets, each of the one or more digital data packets including a priority level, the priority level indicating a relative level of importance of timely delivery of the digital data packet to the network device;

means for creating a priority mask field in the frame; and means for placing in the priority mask field, a value signifying which priority levels should be paused.

43. The apparatus of claim 42 wherein the value further indicates that the pausing will be for time indicated by a pause time field in the frame without regard for the priority level if it is desired to use the same pause time for each priority.

44. The apparatus of claim 42, further comprising:

means for placing in an opcode field in the frame, a value signifying that the pausing will be for times corresponding to each priority level indicated by a pause time field if it is desired to use the same pause time for each priority.

45. The apparatus of claim 44, further comprising:

means for placing in the pause time field, a separate value for each possible priority level, the separate value indicating an independent pause time for each corresponding priority level.

46. The apparatus of claim 45, wherein the pause time field is equal in size to the pause time field in a standard PAUSE frame multiplied by the number of possible priorities.

47. The apparatus of claim 42, wherein the frame is a PAUSE frame.

48. The apparatus of claim 42, wherein the value signifying that traffic flow to the network device should be paused or not paused according to its priority level is a value not used by standard PAUSE frames in the type/length field.

49. An apparatus comprising:

means for examining a value in a type/length field in a frame to determine if it signifies that the frame indicates that traffic flow to a network device should be paused, the traffic flow comprising one or more digital data packets, each of the one or more digital data packets including a priority level, the priority level indicating a relative level of importance of timely delivery of the digital data packet to the network device;

means for examining a value in an opcode field in the frame to determine if it signifies that traffic flow to the network device should be paused or not paused according to its priority level, if the value in the type/length field signified that the frame indicates that traffic flow to the network device should be paused; and means for pausing traffic flow to the network device with priority levels corresponding to levels signified by a value in a priority mask field in the frame if the value in the opcode field signified that traffic flow to the network device should be paused or not paused according to its priority level and if the value in the type/length field signified that the frame indicates that traffic flow to the network device should be paused.

50. The apparatus of claim 49, wherein the means for examining a value in an opcode field further comprises means for examining a value in the opcode field to determine if it also signifies that the pausing will be for time indicated by a pause time field in the frame without regard to priority level and the means for pausing traffic flow further comprises means for pausing traffic flow to the network device with priority levels corresponding to levels signified by a value in a priority mask field in the frame for a time period indicated by the pause time field in the frame without regard to priority level if the opcode field signifies that the pausing will be for time indicated by a pause time field in the frame without regard to priority level.

51. The apparatus of claim 49, wherein the means for examining a value in an opcode field further comprises means for examining a value in the opcode field to determine if it also signifies that the pausing will be for times corresponding to each priority level indicated by a pause time and the means for pausing traffic flow further comprises means for pausing traffic flow to the network device with priority levels corresponding to levels signified by a value in a priority mask field in the frame for time periods indicated by a times corresponding to each priority level in a pause time field in the frame if the opcode field signifies that the pausing will be for times corresponding to each priority level indicated by a pause time.

52. The apparatus of claim 51, wherein the times are a separate value for each possible priority level indicating an independent pause time for each corresponding priority level.

53. An apparatus comprising:

means for examining a value in a type/length field in a frame to determine if it signifies that the frame indicates that traffic flow to a network device should be paused and if it signifies that traffic flow to the network device should be paused or not paused according to its priority level, the traffic flow comprising one or more digital data packets, each of the one or more digital data packets including a priority level, the priority level indicating a relative level of importance of timely delivery of the digital data packet to the network device; and means for pausing traffic flow to the network device with priority levels corresponding to levels signified by a value in a priority mask field in the frame if the value in the type/length field signified that traffic flow to the network device should be paused and that traffic flow to the network device should be paused or not paused according to its priority level.

54. The apparatus of claim 53, further comprising:

means for examining a value in an opcode field in the frame to determine if it signifies that the pausing will be for time indicated by a pause time field in the frame without regard to priority level; and wherein the means for pausing traffic flow further comprises means for pausing traffic flow to the network device with priority levels corresponding to levels signified by a value in a priority mask field in the frame for a time period indicated by the pause time field in the frame without regard to priority level if the value in the opcode field signifies that the pausing will be for time indicated by a pause time field in the frame without regard to priority level.

55. The apparatus of claim 53, further comprising:

means for examining a value in the type/length field to determine if it also signifies that the pausing will be for times corresponding to each priority level indicated by a pause time; and wherein the means for pausing traffic flow further comprises means for pausing traffic flow to the network device with priority levels corresponding to levels signified by a value in a priority mask field in the frame for time periods indicated by a times corresponding to each priority level in a pause time field in the frame if the type/length field signifies that the pausing will be for times corresponding to each priority level indicated by a pause time.

56. The apparatus of claim 55, wherein the times are a separate value for each possible priority level indicating an independent pause time for each corresponding priority level.

57. A computer program storage device readable by a computer, tangibly embodying a computer program of instructions executable by the computer to perform a method in a network device, the method comprising:

determining, in the network device, a present need to pause traffic flow to the network device, and if a present need to pause traffic flow to the network device is determined, placing in a type/length field in a frame, a value signifying the frame indicates that traffic flow to the network device should be paused, the traffic flow comprising one or more digital data packets, each of the one or more digital data packets including a priority level, the priority level indicating a relative level of importance of timely delivery of the digital data packet to the network device;

placing in an opcode field in the frame, a value signifying that traffic flow to the network device should be paused or not paused according to its priority level;

creating a priority mask field in the frame; and placing in the priority mask field, a value signifying which priority levels should be paused.

58. A computer program storage device readable by a computer, tangibly embodying a computer program of instructions executable by the computer to perform a method in a network device, the method comprising:

determining, in the network device, a present need to pause traffic flow to the network device, and if a present need to pause traffic flow to a network device is determined, placing in a type/length field in a frame, a value signifying that traffic flow to the network device should be paused or not paused according to its priority level, the traffic flow comprising one or more digital data packets, each of the one or more digital data packets including a priority level, the priority level indicating a relative level of importance of timely delivery of the digital data packet to the network device;

creating a priority mask field in the frame; and placing in the priority mask field, a value signifying which priority levels should be paused.

59. A computer program storage device readable by a computer, tangibly embodying a computer program of instructions executable by the computer to perform a method in a network device, the method comprising:

examining, in the network device, a value in a type/length field in a frame to determine if it signifies that the frame indicates that traffic flow to the network device should be paused, the traffic flow comprising one or more digital data packets, each of the one or more digital data packets including a priority level, the priority level indicating a relative level of importance of timely delivery of the digital data packet to the network device;

examining a value in an opcode field in the frame to determine if it signifies that traffic flow to the network device should be paused or not paused according to its priority level, if the value in the type/length field signified that the frame indicates that traffic flow to the network device should be paused; and pausing traffic flow to the network device with priority levels corresponding to levels signified by a value in a priority mask field in the frame if the value in the opcode field signified that traffic flow to the network device should be paused or not paused according to its priority level and if the value in the type/length field signified that the frame indicates that traffic flow to the network device should be paused.

60. A computer program storage device readable by a computer, tangibly embodying a computer program of instructions executable by the computer to perform a method in a network device, the method comprising:

examining, in the network device, a value in a type/length field in a frame to determine if it signifies that the frame indicates that traffic flow to the network device should be paused and if it signifies that traffic flow to the network device should be paused or not paused according to its priority level, the traffic flow comprising one or more digital data packets, each of the one or more digital data packets including a priority level, the priority level indicating a relative level of importance of timely delivery of the digital data packet to the network device; and pausing traffic flow to the network device with priority levels corresponding to levels signified by a value in a priority mask field in the frame if the value in the type/length field signified that traffic flow to a network device should be paused and that traffic flow to the network device should be paused or not paused according to its priority level.

61. A method comprising:

determining a present need to pause traffic to a network device, the traffic flow comprising one or more digital data packets, each of the one or more digital data packets including a priority level, the priority level indicating a relative level of importance of timely delivery of the digital data packet to the network device; and responsive to the determining, placing in a type/length field in a frame, a value signifying the frame indicates that traffic flow to the network device should be paused;

placing in an opcode field in the frame, a value signifying that traffic flow to the network device should be paused or not paused according to its priority level, and that the pausing will be for time indicated by a pause time field in the frame without regard for the priority level if it is desired to use the same pause time for each priority level;

creating a priority mask field in the frame; and placing in the priority mask field, a value signifying which priority levels should be paused.

62. A method comprising:

determining a present need to pause traffic to a network device, the traffic flow comprising one or more digital data packets, each of the one or more digital data packets including a priority level, the priority level indicating a relative level of importance of timely delivery of the digital data packet to the network device; and responsive to the determining, placing in a type/length field in a frame, a value signifying that traffic flow to the network device should be paused or not paused according to its priority level, the value further indicating that the pausing will be for time indicated by a pause time field in the frame without regard for the priority level, if it is desired to use the same pause time for each priority;

creating a priority mask field in the frame; and placing in the priority mask field, a value signifying which priority levels should be paused.

63. A method comprising:

examining a value in a type/length field in a frame to determine if it signifies that the frame indicates that traffic flow to a network device should be paused;

if the value in the type/length field signified that the frame indicates that traffic flow to the network device should be paused, examining a value in an opcode field in the frame to determine if it signifies that traffic flow to the network device should be paused or not paused according to its priority level; and examining the value in the opcode field to determine if it also signifies that the pausing will be for time indicated by a pause time field in the frame without regard to priority level;

pausing traffic flow to the network device with priority levels corresponding to levels signified by a value in a priority mask field in the frame if the value in the opcode field signified that traffic flow to the network device should be paused or not paused according to its priority level and if the value in the type/length field signified that the frame indicates that traffic flow to the network device should be paused; and pausing traffic flow to the network device with priority levels corresponding to levels signified by a value in a priority mask field in the frame for a time period indicated by the pause time field in the frame without regard to priority level if the opcode field signifies that the pausing will be for time indicated by a pause time field in the frame without regard to priority level.

64. A method comprising:

examining a value in a type/length field in a frame to determine if it signifies that the frame indicates that traffic flow to a network device should be paused and if it signifies that traffic flow to the network device should be paused or not paused according to its priority level;

examining a value in an opcode field in the frame to determine if it signifies that the pausing will be for time indicated by a pause time field in the frame without regard to priority level;

pausing traffic flow to the network device with priority levels corresponding to levels signified by a value in a priority mask field in the frame if the value in the type/length field signified that traffic flow to a network device should be paused and that traffic flow to the network device should be paused or not paused according to its priority level; and pausing traffic flow to the network device with priority levels corresponding to levels signified by a value in a priority mask field in the frame for a time period indicated by the pause time field in the frame without regard to priority level if the value in the opcode field signifies that the pausing will be for time indicated by a pause time field in the frame without regard to priority level.

65. An apparatus comprising:
a pause traffic flow value-to-type/length field placer configured to, if a present need to pause traffic to a network device is determined, place in a type/length field in a frame, a value signifying the frame indicates that traffic flow to the network device should be paused;
a priority level based pause traffic flow value-to-opcode field placer coupled to the pause traffic flow value-to-type/length field placer and configured to place in an opcode field in the frame, a value signifying that traffic flow to the network device should be paused or not paused according to its priority level, and that the pausing will be for time indicated by a pause time field in the frame without regard for the priority level if it is desired to use the same pause time for each priority level;
a priority mask field creator coupled to the priority level based pause traffic flow value-to-opcode field placer and configured to create a priority mask in the frame; and
a paused priority level value-to-priority mask field placer coupled to the priority mask field creator and configured to place in the priority mask field, a value signifying which priority levels should be paused.

66. An apparatus comprising:
a priority level based pause traffic flow value-to-type/length field placer configured to, if a present need to pause traffic to a network device is determined, place in a type/length field in a frame, a value signifying that traffic flow to the network device should be paused or not paused according to its priority level;
a priority mask field creator coupled to the priority level based pause traffic flow value-to-type/length field placer and configured to create a priority mask field in the frame;
a paused priority level value-to-priority mask field placer coupled to the priority mask field creator and configured to place in the priority mask field, a value signifying which priority levels should be paused; and
a pause time without regard for priority level value-to-opcode field placer coupled to the priority level based pause traffic flow value-to-type/length field placer and configured to place in an opcode field in the frame, a value signifying that the pausing will be for time indicated by a pause time field in the frame without regard for the priority level if it is desired to use the same pause time for each priority.

67. An apparatus comprising:
means for determining a present need to pause traffic to a network device, the traffic flow comprising one or more digital data packets, each of the one or more digital data packets including a priority level, the priority level indicating a relative level of importance of timely delivery of the digital data packet to the network device; and
means for, responsive to the determining,
placing in a type/length field in a frame, a value signifying the frame indicates that traffic flow to the network device should be paused;
placing in an opcode field in the frame, a value signifying that traffic flow to the network device should be paused or not paused according to its priority level, and that the pausing will be for time indicated by a pause time field in the frame without regard for the priority level if it is desired to use the same pause time for each priority level;
creating a priority mask field in the frame; and
placing in the priority mask field, a value signifying which priority levels should be paused.

68. An apparatus comprising:
means for determining a present need to pause traffic to a network device, the traffic flow comprising one or more digital data packets, each of the one or more digital data packets including a priority level, the priority level indicating a relative level of importance of timely delivery of the digital data packet to the network device; and
means for, responsive to the determining,
placing in a type/length field in a frame, a value signifying that traffic flow to the network device should be paused or not paused according to its priority level, the value further indicating that the pausing will be for time indicated by a pause time field in the frame without regard for the priority level, if it is desired to use the same pause time for each priority;
creating a priority mask field in the frame; and
placing in the priority mask field, a value signifying which priority levels should be paused.

69. An apparatus comprising:
means for examining a value in a type/length field in a frame to determine if it signifies that the frame indicates that traffic flow to a network device should be paused;
means for, if the value in the type/length field signified that the frame indicates that traffic flow to the network device should be paused,
examining a value in an opcode field in the frame to determine if it signifies that traffic flow to the network device should be paused or not paused according to its priority level; and
examining the value in the opcode field to determine if it also signifies that the pausing will be for time indicated by a pause time field in the frame without regard to priority level;
means for pausing traffic flow to the network device with priority levels corresponding to levels signified by a value in a priority mask field in the frame if the value in the opcode field signified that traffic flow to the network device should be paused or not paused according to its priority level and if the value in the type/length field signified that the frame indicates that traffic flow to the network device should be paused; and
means for pausing traffic flow to the network device with priority levels corresponding to levels signified by a value in a priority mask field in the frame for a time period indicated by the pause time field in the frame without regard to priority level if the opcode field signifies that the pausing will be for time indicated by a pause time field in the frame without regard to priority level.

70. An apparatus comprising:
means for examining a value in a type/length field in a frame to determine if it signifies that the frame indicates that traffic flow to a network device should be paused and if it signifies that traffic flow to the network device should be paused or not paused according to its priority level;
means for examining a value in an opcode field in the frame to determine if it signifies that the pausing will be for time indicated by a pause time field in the frame without regard to priority level;
means for pausing traffic flow to the network device with priority levels corresponding to levels signified by a value in a priority mask field in the frame if the value in the type/length field signified that traffic flow to a network device should be paused and that traffic flow to the network device should be paused or not paused according to its priority level; and means for pausing traffic flow to the network device with priority levels corresponding to levels signified by a value in a priority mask field in the frame for a time period indicated by the pause time field in the frame without regard to priority level if the value in the opcode field signifies that the pausing will be for time indicated by a pause time field in the frame without regard to priority level.

\* \* \* \* \*

UNITED STATES PATENT AND TRADEMARK OFFICE
CERTIFICATE OF CORRECTION

PATENT NO.       : 7,639,608 B1                          Page 1 of 1
APPLICATION NO.  : 10/693037
DATED            : December 29, 2009
INVENTOR(S)      : Jain et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1295 days.

Signed and Sealed this

Ninth Day of November, 2010

David J. Kappos
*Director of the United States Patent and Trademark Office*